US010817079B2

(12) United States Patent
Ligameri et al.

(10) Patent No.: US 10,817,079 B2
(45) Date of Patent: Oct. 27, 2020

(54) DISPLAYING A SHADOW OF A STYLUS OR OF CONTENT ON A DISPLAY DEVICE

(71) Applicant: Dell Products L. P., Round Rock, TX (US)

(72) Inventors: Mark R. Ligameri, Santa Rosa, FL (US); Michiel S. Knoppert, Amsterdam (NL); Jace W. Files, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 166 days.

(21) Appl. No.: 15/882,623

(22) Filed: Jan. 29, 2018

(65) Prior Publication Data

US 2019/0235648 A1    Aug. 1, 2019

(51) Int. Cl.
*G06F 3/0354* (2013.01)
*G06F 3/02* (2006.01)
*G06F 3/0346* (2013.01)
*G06F 3/0481* (2013.01)
*G06T 15/50* (2011.01)
*G06T 15/60* (2006.01)
*G06F 3/0484* (2013.01)
*G06F 3/0488* (2013.01)

(52) U.S. Cl.
CPC ........... *G06F 3/03545* (2013.01); *G06F 3/02* (2013.01); *G06F 3/0346* (2013.01); *G06F 3/04815* (2013.01); *G06F 3/04842* (2013.01); *G06F 3/04847* (2013.01); *G06T 15/506* (2013.01); *G06T 15/60* (2013.01); *G06F 3/0488* (2013.01); *G06T 2215/16* (2013.01)

(58) Field of Classification Search
CPC ...... G06F 3/03545; G06F 3/02; G06F 3/0346; G06F 3/04815; G06F 3/04842; G06F 3/04847; G06F 3/0488; G06T 15/506; G06T 15/60; G06T 2215/16
USPC .......................................... 345/179
See application file for complete search history.

(56) References Cited

U.S. PATENT DOCUMENTS

| 2003/0030622 | A1* | 2/2003 | Vaarala | G06F 3/0386 345/158 |
| 2009/0027391 | A1* | 1/2009 | Burley | G06T 15/04 345/426 |
| 2014/0035886 | A1* | 2/2014 | Idzik | G06F 3/01 345/179 |
| 2015/0277587 | A1* | 10/2015 | Chandran | G06F 3/0416 345/173 |
| 2018/0040156 | A1* | 2/2018 | Kondo | G06F 3/0481 |

* cited by examiner

*Primary Examiner* — Amare Mengistu
*Assistant Examiner* — Gloryvid Figueroa-Gibson
(74) *Attorney, Agent, or Firm* — Campbell Stephenson LLP; Shiv S. Naimpally

(57) ABSTRACT

In some examples, a computing device may receive stylus sensor data from one or more sensors in a stylus that is used to interact with the computing device. The computing device may determine, based on the stylus sensor data, (i) a stylus height of a tip of the stylus from a display device and (ii) one or more stylus angles of the stylus relative to the display device. The computing device may display, on the display device, a virtual shadow of the stylus at a location based at least in part on the stylus height, the stylus angles, and a location of a virtual light source. The computing device may display, on the display device, one or more virtual shadows of content items corresponding to the stylus acting as a virtual light source.

20 Claims, 12 Drawing Sheets

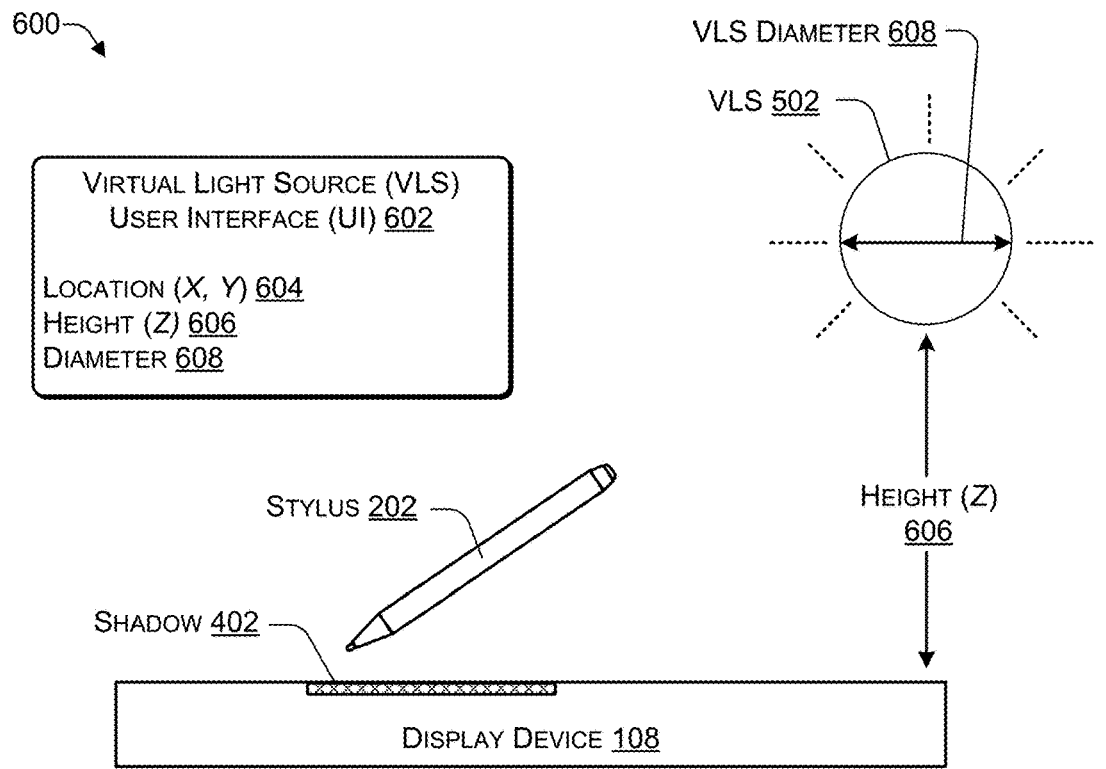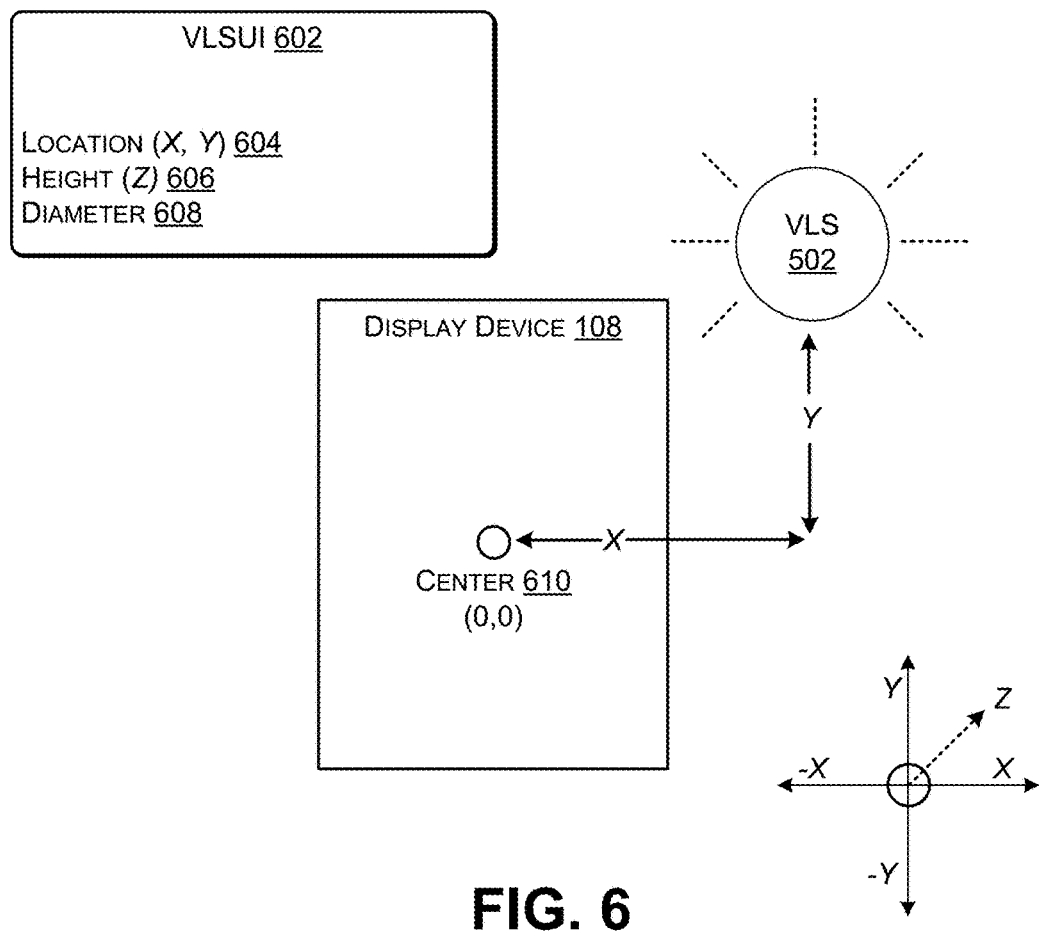
FIG. 6

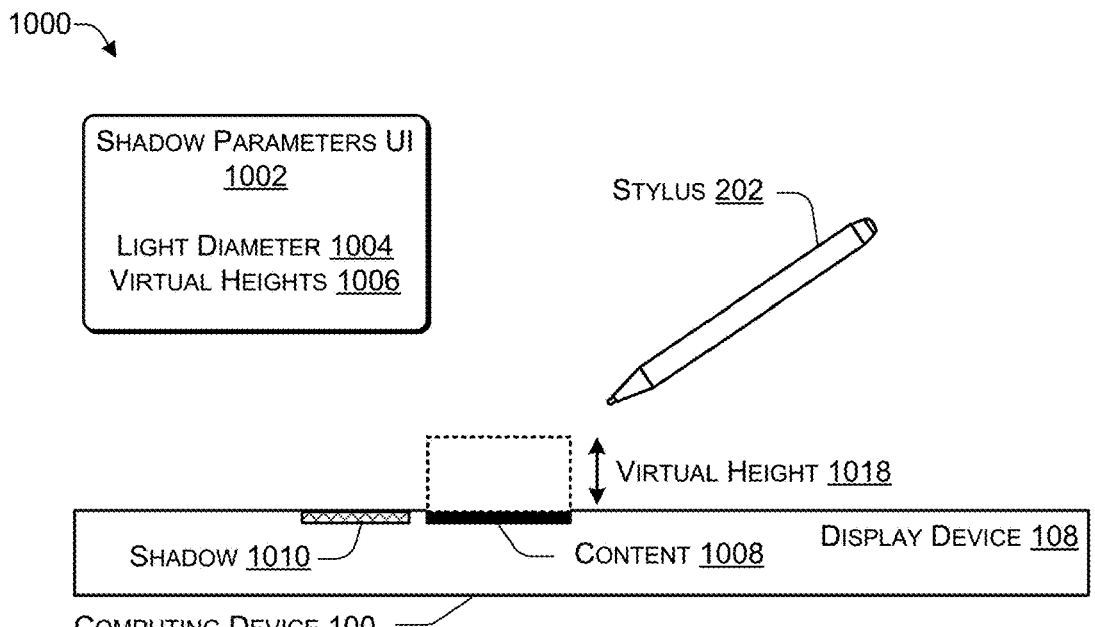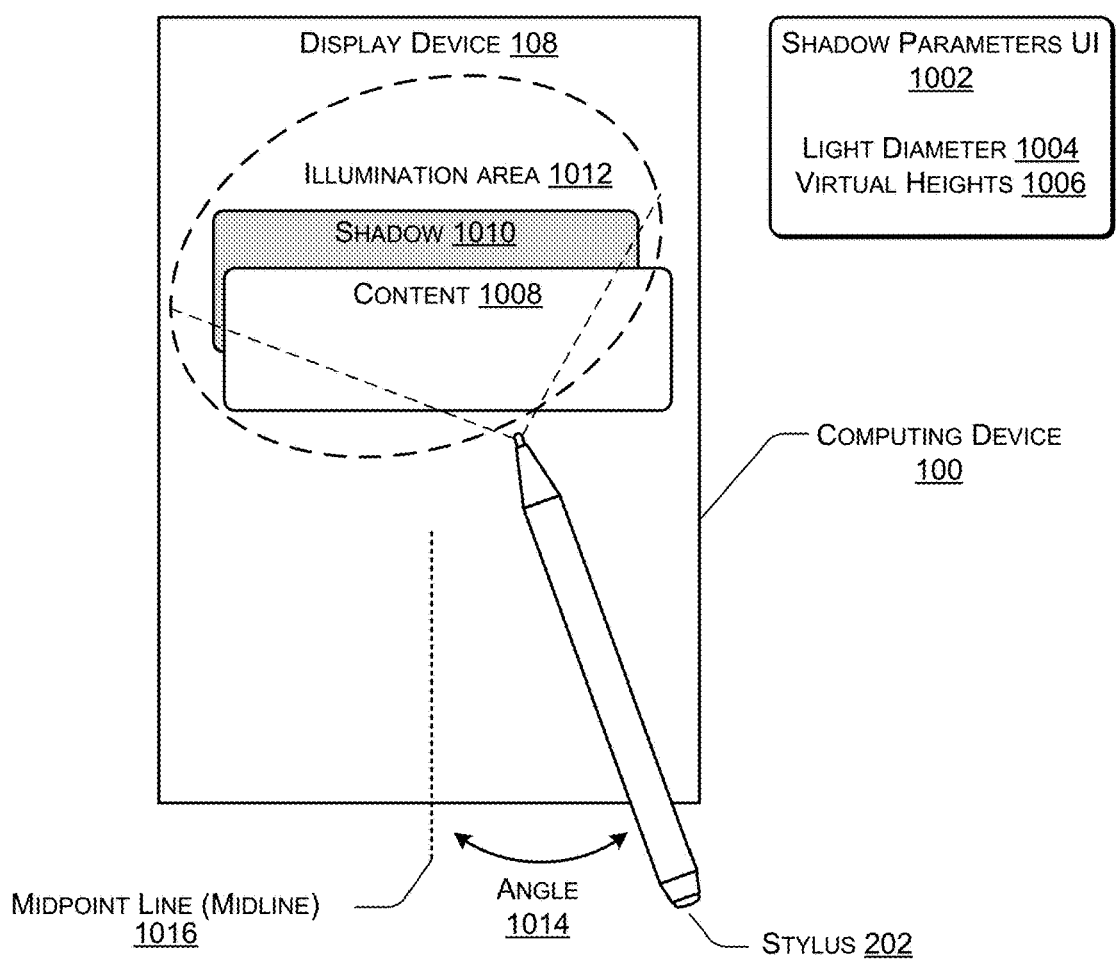
FIG. 10

DISPLAYING A SHADOW OF A STYLUS OR OF CONTENT ON A DISPLAY DEVICE

BACKGROUND OF THE INVENTION

Field of the Invention

This invention relates generally to computing devices capable of receiving stylus-based input and, more particularly, to displaying a shadow of either an active stylus or of content to enable the active stylus to be used to provide input without the tip of the active stylus touching a touch-sensitive display device.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A touchscreen computing device, such as a tablet or 2-in-1 device, may be used with an operating system (e.g., Windows® 10 or similar) to receive input from an active stylus. The input may also be referred to as pen-input or pencil-input. On devices with a relatively small (e.g., less than 10" diagonal) display device, using the active stylus to navigate a user interface, select from a menu, and perform other input-related and selection-related activities may be difficult because the user may be unable to determine, with relative accuracy, where on the surface of the display device the tip of the active stylus is located. When a user interface is displayed, the user may inadvertently select, using the active stylus, a selection adjacent to the user's intended selection, because the user is unable to determine precisely where the tip of the active stylus is located when making the selection. Such issues may provide users with a negative user experience when using a computing device with a relatively small touchscreen display.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a computing device may receive stylus sensor data from one or more sensors in a stylus that is used to interact with the computing device. The computing device may determine, based on the stylus sensor data, (i) a stylus height of a tip of the stylus from a display device and (ii) multiple stylus angles of the stylus relative to the display device. The computing device may display, on the display device, a virtual shadow of either content items or the stylus.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

FIG. 6 is a block diagram illustrating a user interface to specify parameters associated with a virtual light source according to some embodiments.

FIG. 10 is a block diagram illustrating a user interface to specify parameters associated with a stylus as a virtual light source according to some embodiments.

DETAILED DESCRIPTION

Figure 1:
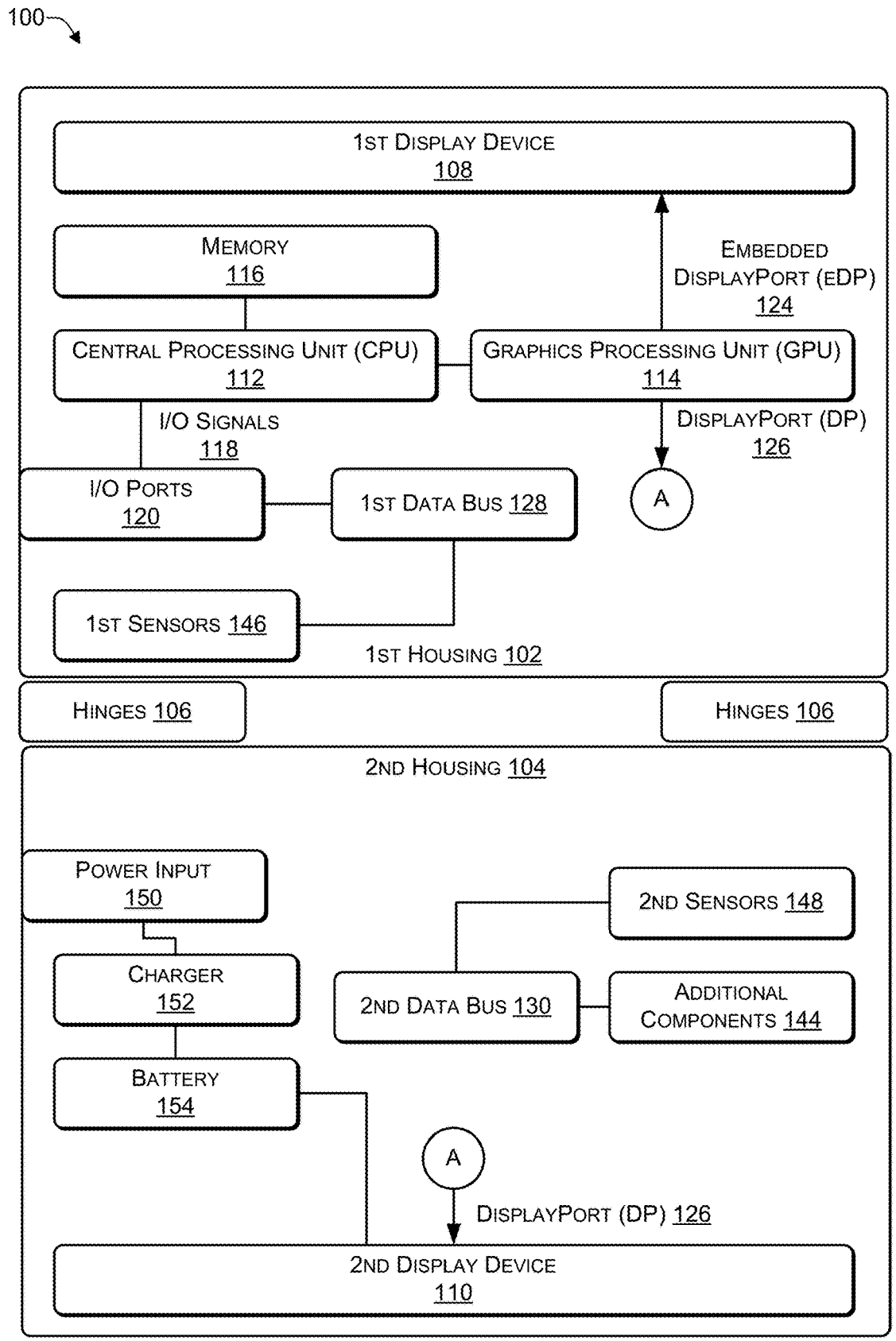
FIG. 1 is a block diagram of an architecture of a computing device according to some embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein enable a user to interact with a computing device using a stylus in a manner similar to interacting with a pad of paper using an ink-based pen (or a paper-based notebook using a graphite-based pencil) by displaying a shadow of the content or the stylus during the interaction.

Displaying a Shadow of a Stylus

When the user uses a stylus to enter input into a touchscreen display device of the computing device, a shadow of the stylus may be displayed on the display device based on the VLS. The stylus shadow may enable the user to select an item in a user interface (UI) by moving the stylus to position the tip of the stylus shadow near the item and selecting a particular button on the stylus. As used herein, the term stylus refers to an input device that includes electronic components (e.g., sensors and the like) that enable a user to write directly onto touchscreen display device of a computing device such as a smartphone, tablet computer, or laptop computer. The stylus may include a near field communication technology, such as, for example, Bluetooth® that enables the stylus to be associated (e.g., paired) with a particular computing device.

The systems and techniques may enable the user to display a shadow of the stylus to enable the user to visually understand (i) how close the stylus is to a touchscreen display device and (i) the angle of the pen relative to the touchscreen display device. For example, moving the stylus closer to the touchscreen display device may make the shadow smaller while moving the stylus away from the touchscreen display device may make the shadow bigger, and eventually fade away. Thus, the user may navigate and provide input to a graphical user interface (GUI) based on the location, the angle, and the distance of the stylus to the display device.

The stylus shadow may provide the user with visual feedback that mimics the natural interactions when writing with a pen (or pencil) and paper. For example, as the angle of the stylus changes during interactions with the display device, the shadow may move relative to the stylus position. The stylus may include sensors, such as an accelerometer, to enable the computing device to determine an angle θ of the pen relative to an outer surface of the display device. The computing device may determine (e.g., using stylus sensors, Electromagnetic Resonance (EMR), Bluetooth®, or another type of technology) a distance between the stylus tip and the surface of the display device. The computing device may determine a direction and angle of the stylus (e.g., using tilt direction, e-compass, palm rejection assistance, user handedness, or the like). Based on the location of the stylus tip and the angle of the stylus, a location to which the stylus is pointing can be determined. An algorithm may use the VLS along with the direction, location (including height from the surface of the display device), and angle of the stylus to display a simulated shadow of the stylus.

The systems and techniques may provide a UI to enable the size and location of the VLS to be specified. For example, the UI may enable a user to specify a diameter of the VLS (e.g., thereby determining the size of the VLS). The UI may enable a user to specify a location of the VLS in three dimensions, relative to the center of the computing device 100 or relative to one of the display devices 108 or 110. For example, the center may have coordinates (0, 0, 0) and the user may specify x, y, and z coordinates relative to the center. By specifying the location of the VLS, the user can choose a location for the VLS that casts a stylus shadow that is suited to the user's dominant hand (e.g., left-handed or right-handed), the way in which the user grips the stylus, where the user prefers to view the stylus shadow, and the like. For example, a right-handed user may specify that the VLS is located behind the user's right shoulder while a left-handed user may specify that the VLS is located behind the user's left shoulder. The location of the VLS may be specified per application to enable a user to specify a first location for the VLS in a first application (e.g., draw/paint application) and a second location for the VLS in a second application (e.g., write or text input using character recognition). For example, if the user writes with one hand and draws with the other hand, the user can specify a location for the VLS for a particular application that suits the hand in which the user is holding the stylus for the particular application.

Thus, a computing device may include a display device, one or more processors, and one or more computer-readable storage media to store instructions that are executable by the one or more processors to perform various operations. The computing device may be associated (e.g., paired) with a stylus. The display device may include a pressure sensitive (e.g., touch-sensitive) surface and the stylus may be used to interact with the pressure-sensitive surface of the display device. The operations may include receiving stylus sensor data from one or more sensors in the stylus and determining (e.g., based at least in part on the stylus sensor data) (i) a stylus height of a tip of the stylus from the display device and (ii) a stylus angle of the stylus relative to the display device. The computing device may determine a virtual shadow of the stylus based at least in part on: (i) the stylus height, (ii) the stylus angle, and (iii) a location of a virtual light source. The computing device may display the virtual shadow on the display device at an initial location with an initial size and pointing in an initial direction. The operations may include determining a location of a shadow tip of the virtual shadow, where the shadow tip corresponds to the tip of the stylus. The operations may include determining that the location of the shadow tip is within a predetermined distance from an element in a user interface (UI), and indicating a selection of the element in the UI. The operations may include receiving, from the one or more sensors in the stylus, button press data indicating a confirmation of the selection of the element, and confirming the selection of the element in the user interface. For example, the stylus may include one or more buttons and the button press data may be sent from the stylus to the computing device based at least in part on detecting the selection of a particular button of the one or more buttons. The operations may include displaying a parameter interface associated with the virtual light source and receiving, via the parameter interface, x, y, and z coordinates specifying (or modifying) a location of the virtual light source in three-dimensional space relative to a center of the display device (or a center of the computing device). The operations may include receiving, via the parameter interface, size data specifying (or modifying) a diameter (e.g., a size) of the virtual light source. The operations may include receiving second stylus sensor data from the one or more sensors of a stylus, determining (e.g., based at least in part on the second stylus sensor data) (i) a second stylus height of the tip of the stylus from the display device, and (ii) a second stylus angle of the stylus relative to the display device. The operations may include displaying, on the display device, the virtual shadow of the stylus at a second location based at least in part on the second stylus height, the second stylus angle, and the virtual light source. For example, the computing device may determine, based on the second stylus sensor data, that the height and/or angle of the stylus has changed, determine a new size, a new shape, and a new location to display the virtual shadow of the stylus, and display the virtual shadow with the new size and new shape at the new location. To illustrate, the computing device may move the virtual shadow of the stylus from the initial location to the new location. The movement of the virtual shadow on the display device may track the movement of the stylus relative to the display device.

Displaying a Shadow of Content Items

When the user uses a stylus on a touchscreen display device of the computing device, the tip of the stylus may function as a virtual light source, enabling the stylus to be used as a virtual flashlight. The computing device may determine and display a shadow of individual content items being displayed on the display device based on the virtual light emitted from the tip of the stylus. For example, each content item may have a predetermined virtual height. In some cases, different types of content items may have different virtual heights. For example, a user interface (UI) may have a first virtual height and elements within the UI may have a second virtual height that is greater than the first virtual height. Thus, for nested content or hierarchical content, the virtual height may vary based on how deep (or high) a particular content item is in the nesting (or hierarchy). For example, if content at a first level includes content at a second level, and each content item at the second level includes content at a third level, then each level may have a different virtual height. To illustrate, the content at the first level may have a first virtual height, the content at the second level may have a second virtual height that is greater (e.g., higher) than the first virtual height, and the content at the third level may have a third virtual height that is greater (e.g., higher) than the second virtual height. In this way, the length of the shadow cast by each content item may visually indicate where in the nesting/hierarchy the content item is located.

Thus, a computing device may include a display device, one or more processors, and one or more computer-readable storage media to store instructions that are executable by the one or more processors to perform various operations. The computing device may be associated (e.g., paired) with a stylus. The display device may include a pressure sensitive (e.g., touch-sensitive) surface and the stylus may be used to interact with the pressure-sensitive surface of the display device. The operations may include receiving stylus sensor data from one or more sensors located in a stylus and determining, based on the stylus sensor data, a stylus height of a tip of the stylus from a display device associated with a computing device. The operations may include determining, based on the stylus sensor data, (1) a first stylus angle of the stylus relative to a top surface of the display device and (2) a second stylus angle of the stylus relative to a midline of the display device. The operations may include determining an area that is illuminated by virtual light emitted from the tip of the stylus, determining one or more content items that are being displayed on the display device and within the area. The operations may include determining one or more virtual heights, wherein an individual virtual height of the one or more virtual heights corresponds to a content item of the one or more content items and displaying, on the display device, one or more virtual shadows corresponding to the one or more content items based at least in part on: the stylus height; the first stylus angle relative to the top surface of the display device; and the second stylus angle relative to a midline of the display device. The operations may include determining a location of a tip of the stylus, determining that the location is within a predetermined distance from a particular content item, and indicating a selection of the particular content item. The operations may include receiving, from the one or more sensors in the stylus, button press data indicating a confirmation of the selection of the particular content item and confirming the selection of the particular content item. The stylus may include one or more buttons and button press data may be sent from the stylus to the computing device based at least in part on detecting a button selection of a particular button of the one or more buttons. The operations may include displaying a shadow parameters interface associated with the virtual light emitted from the tip of the stylus and receiving, via the shadow parameter interface, input specifying (1) a diameter of the virtual light being emitted from the tip of the stylus and (2) a virtual height measurement for at least one type of content item. The type of the content item may include one of: a user interface element, text characters, an illustration, or a photograph. The operations may include receiving second stylus sensor data from the one or more sensors of a stylus and moving the one or more virtual shadows from a first location to a second location on the display device based at least in part on the stylus sensor data.

FIG. 1 is a block diagram of an architecture of a computing device 100 according to some embodiments. In some cases, the computing device 100 may include two (or more) housings while in other cases the computing device 100 may include a single housing (e.g., a tablet form factor).

As illustrated in FIG. 1, the computing device 100 may include a first housing 102 coupled to a second housing 104 via one or more hinges 106. The hinges 106 may enable the two housings 102, 104 to be positioned at different angles relative to each other in different orientations (e.g., various vertical orientations and various horizontal orientations), e.g., between about 0 degrees to about 360 degrees. Of course, additional housings may be attached via additional hinges to create a computing device with multiple housings and multiple display devices that can be folded for portability and unfolded to create a large display device (e.g., comprised of multiple smaller display devices).

A first display device 108 may be located in the first housing 102 and, in some cases, a second display device 110 may be located in the second housing 104. A first portion of the components of the computing device 100 may be located in the first housing 102 (e.g., behind the first display device 108) while a remaining portion of the components of the computing device 100 may be located in the second housing 104 (e.g., behind the second display device 110). For example, as illustrated in FIG. 1, the components located in the first housing 102 may include at least one central processing unit (CPU) 112, a graphics process unit (GPU) 114, and a memory (e.g., computer-readable media) 116. The GPU 114 may be integrated into the CPU 112 or may be a separate device from the GPU 114. The CPU 112 may communicate input/output (I/O) signals 118 via multiple I/O post 120. The I/O ports 120 may include video ports (e.g., a video graphics adapter (VGA) port, a digital video interface (DVI) port, a high definition media interface (HDMI) port, a ThunderBolt® port, or the like), audio ports (e.g., microphone jack, headphone jack, and the like), data ports (e.g., universal serial bus (USB) ports compliant with USB 2.0, USB 3.0, and the like), communication ports (e.g., Ethernet and the like), another type of port, or any combination thereof. In some cases, the computing device 100 may include at least one digital signal processing (DSP) processor 122 to perform audio (and video) signal processing. The GPU 114 may provide two or more lanes of embedded DisplayPort (eDP) output 124 that are sent to the first display device 108 in the first housing 102 and two or more lanes of DisplayPort (DP) output 126 that are sent (e.g., wirelessly or via a cable) to the second display device 110 in the second housing 104.

A first data bus 128 in the first housing 102 and a second data bus 130 in the second housing 104 may distribute data among the various components of the computing device 100. For example, the data buses 128, 130 may distribute data from the I/O signals 118, the I/O ports 120, a first set of sensors 146, a second set of sensors 148, and additional components 144. For example, the data buses 128, 130 may distribute data by receiving data from a component of the computing device 100 and transmitting the data to one or more of the other components of the computing device 100.

The second housing 104 may include a remaining portion of the components of the computing device 100. In some cases, the components in the second housing 104 may be located behind the second display device 110. The second housing 104 may include the additional components 144 (e.g., keyboard, touchpad, trackball, speaker, microphone, Wi-Fi antenna, Bluetooth antenna, Zigbee Antenna, cellular antenna, and the like), the second set of sensors 148, a power input 150 (e.g., alternating current (AC) or direct current (DC) input), a charger 152, and a battery 154. The battery charger 152 may be used as a power source to provide power instead of (or in addition to) the battery 154 when the battery 154 is depleted or inoperable. In some cases, data cables may run through the hinges 106 to connect the components of the computing device 100 located in the first housing 102 with the components of the computing device 100 located in the second housing 104. In other cases, a first wireless transceiver in the first housing 102 and a second wireless transceiver in the second housing 104 may provide wireless communications between (1) the components of the computing device 100 located in the first housing 102 and (2) the components of the computing device 100 located in the second housing 104. Each of the first set of sensors 146 and the second sensors 152 may include one (or more) of a touch-screen sensor (e.g., associated with the corresponding display device), an accelerometer, a gyroscope, an electronic compass (e-compass), a barometer, a magnetometer, a proximity sensor, a light sensor, an imaging sensor (e.g., a camera), a fingerprint sensor, a global positioning satellite (GPS) sensor, an electromagnetic resonance (EMR) sensor, another type of sensor, or any combination thereof.

In FIG. 1, the first set of components of the computing device 100 shown as being located in the first housing 102 and the remaining set of components shown as located in the second housing 104 are purely for illustration purposes. Depending on the implementation, different components of the computing device 100 may be housed in one or both of the housings 102, 104. For example, when the computing device 100 is designed for graphics processing, the GPU 114 and supporting hardware (e.g., graphics support chips, graphics memory, and the like) may be housed in the second housing 104. As another example, in some cases, the ports 120 may be located in the first housing 102, in the second housing 104, or split between the two housings 102, 104. As a further example, the battery 154 may include multiple power cells, with a portion of the power cells located in the first housing 102 and zero or more of the power cells located in the second housing 104. In some cases, which components of the computing device 100 are located in each of the housings 102, 104 may be determined by the thermal characteristics of the components. For example, the components may be distributed between the housings 102, 104 to enable each of the housings 102, 104 to heat to approximately the same temperature. Doing so may avoid grouping components that generate the most heat into the same housing, thereby causing one housing to be hotter than the other housing. In addition, while the computing device 100 is illustrated as having two display devices 108, 110, in some cases the computing device 100 may have a single display device, e.g., when the computing device 100 is configured as a tablet (e.g., all components in a single housing) or a laptop computing device (e.g., with a display in the first housing and input devices, such as a keyboard and touchpad, in the second housing).

Software instructions implementing an operating system and one or more applications, including at least one application capable of receiving stylus input, and various UIs, may be stored in the memory 116. The software instructions may be executed by the CPU 112, by the GPU 114, or any combination thereof.

Thus, a computing device may include a first housing coupled to a second housing by one or more hinges. The computing device may include software that enables a user to use the computing device with a stylus in a manner similar to a pad of paper and ink-based pen (or graphite-based pencil). The computing device may provide a UI that enables the user to specify a size and a location of a VLS. The computing device may determine, using data from sensors in the stylus and in the computing device, the location and angle of the stylus. Based on the sensor data and based on the size and location of the VLS, the computing device may display a shadow of the stylus when the user is interacting with the computing device using the stylus. The location of the VLS may be specified relative to a center of the computing device, relative to a center of one of the display devices, or relative to a center of the display device with which the user is currently interacting. For example, the location of the VLS may be determined relative to the center of the first display device when the user is interacting with the first display device and may be determined relative to the center of the second display device when the user is interacting with the second display device.

Figure 2:
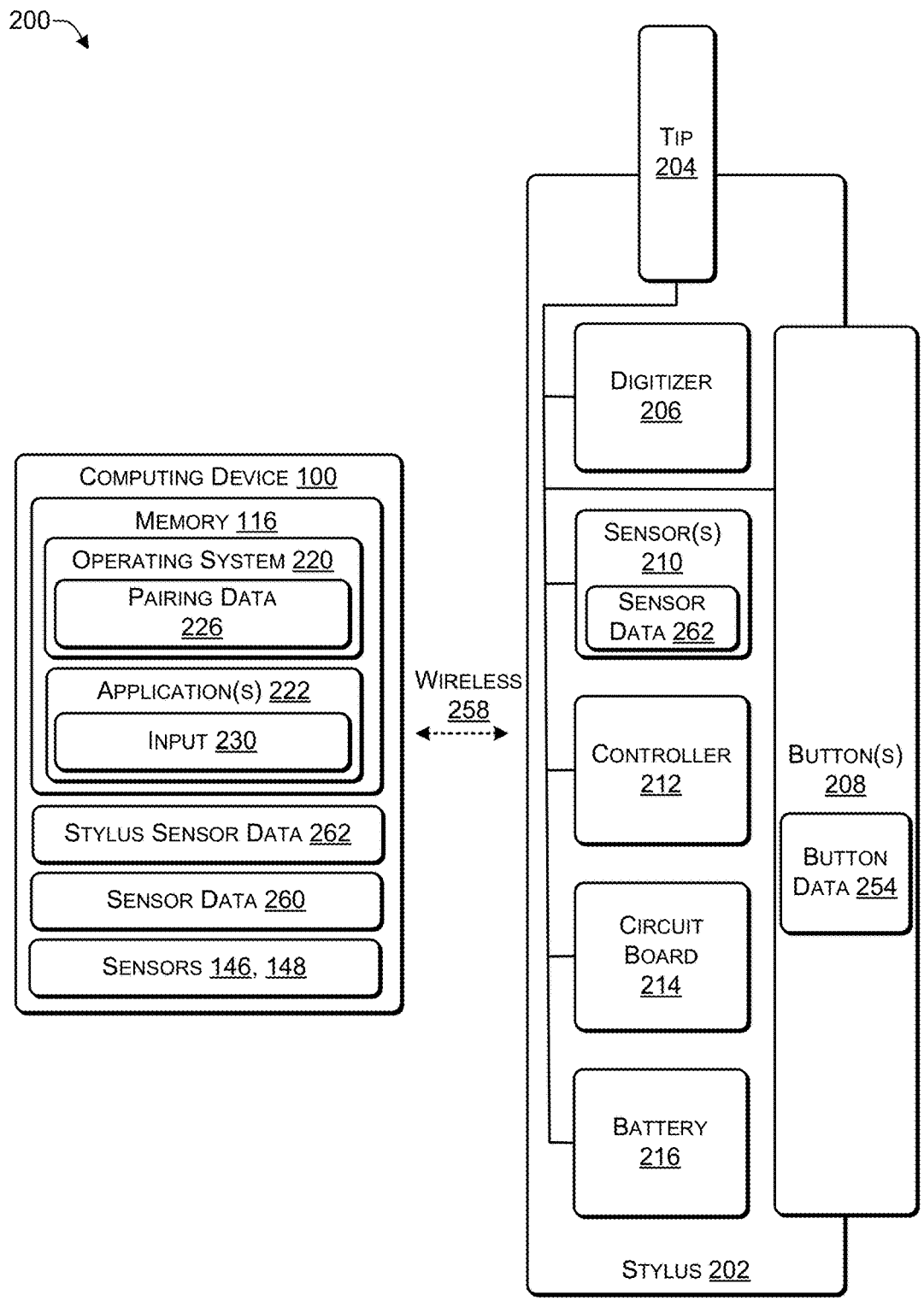
FIG. 2 is a block diagram of an architecture that includes a computing device and a stylus according to some embodiments.

FIG. 2 is a block diagram of an architecture 200 that includes the computing device 100 and a stylus 202 according to some embodiments. The stylus 202 (e.g., active stylus) may include a tip 204, a digitizer 206, one or more buttons 208, one or more sensors 210, a controller 212, a circuit board 214, and at least one battery 216. The tip 204 may be used by a user to apply pressure to a touch sensitive display (e.g., the displays 108, 110 of FIG. 1). One of the sensors 210 may be embedded into the tip 204 and may be used to measure different levels of pressure (e.g., 0 to 16, 0 to 256, or other pressure levels). The sensors 210 may include a pressure sensor (to measure an amount of pressure exerted by the tip 204), a location detection sensor (to determine a current location of the tip 204), a motion sensor (to determine a motion of the tip 204), a tilt sensor (e.g., to measure an angle at which the stylus 202 is being held), another type of sensor, or any combination thereof.

The sensors 146, 148 of the computing device 100 may generate sensor data 260. The sensors 210 of the stylus 202 may generate and send stylus sensor data 262 to the computing device 100. The sensor data 262 may include digital data and analog data. The digitizer 206 may digitally sample analog signals received from one or more of the sensors 210 to create digital signals. The controller 212 may be an embedded controller, a CPU, or another type of logic-execution device that is programmed to perform specific functions, such as receiving the sensor data 262 from the sensors 210, receiving button data 254 from one or more of the buttons 208, transmitting the data 262, 254 to the computing device 100, receiving and acting upon commands (e.g., a pairing command) received from the computing device 100, and the like. One or more of the digitizer 206, the buttons 208, the sensors 210, the controller 212, and the battery 216 may be mounted on the circuit board 214. The battery 216 may provide power (e.g., direct current (DC) voltage) to one or more of the components 204, 206, 208, 210, 212, and 214 of the stylus 202. The circuit board 214 may also include a transducer (e.g., speaker, buzzer, or the like) and one or more lights (e.g., LED or the like).

The memory 116 of the computing device 100 may be used to store software instructions, such as an operating system 220, and one or more applications 222. The operating system 220 may store pairing data 226 identifying devices, such as the stylus 202, with which the computing device 100 is currently associated (e.g., paired). The applications 222 may include applications capable of receiving input 230 via one or more input devices, such as the stylus 202, a keyboard, a trackpad, a numeric keypad, another type of input device, or any combination thereof. The input 230 may include input received via a user manipulating a stylus (e.g., the stylus 202), such as letters, words, sentences, paragraphs and the like written in a cursive or printed script, drawings or other graphical input, and other types of input.

The computing device 100 may communicate with the stylus 202 using a wireless technology 258, such as WiFi®, Bluetooth®, ZigBee®, wireless universal serial bus (USB), or another type of Near Field Communication (NFC) technology that provides wireless communications over a short distance.

Figure 3:
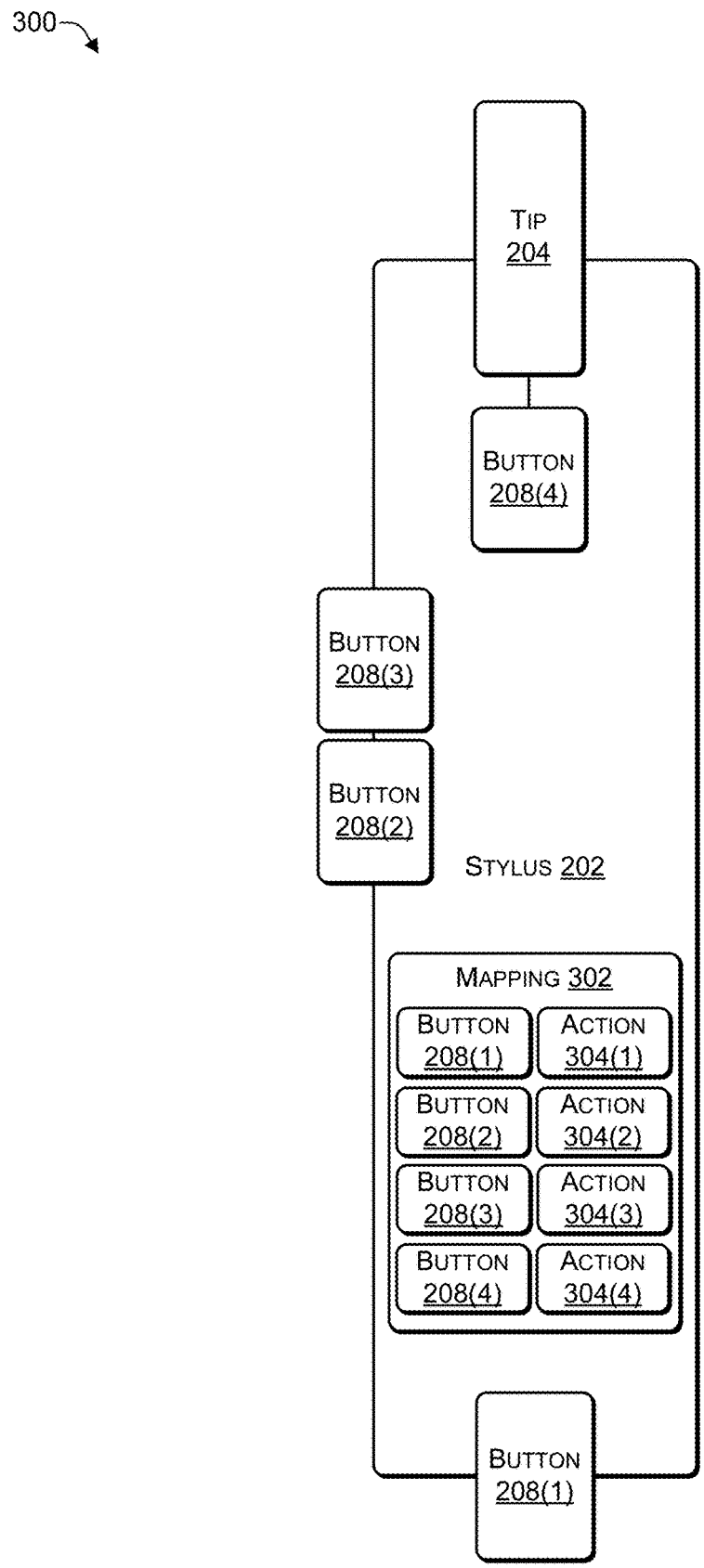
FIG. 3 is a block diagram illustrating components of a stylus according to some embodiments.

FIG. 3 is a block diagram illustrating components of a stylus according to some embodiments. For example, as illustrated in FIG. 3, the stylus 202 may include the buttons 208(1), 208(2), 208(3), and 208(4). The stylus 202 may include a mapping 302 that maps each of the buttons 208 to one or more actions 304 that are performed when the button is selected (e.g., pressed or clicked). For example, selecting the button 208(1) may cause the action(s) 304(1) to be performed, selecting the button 208(2) may cause the action(s) 304(2) to be performed, selecting the button 208(3) may cause the action(s) 304(3) to be performed, and selecting the button 208(4) may cause the action(s) 304(4) to be performed. In some cases, the actions 304 may be a script that performs more than one action. The actions 304 may include sending sensor data, commands, or other types of data to the computing device 100 of FIGS. 1 and 2.

The button 208(1) may located where an eraser is located in a pencil or where a retraction button of a pen is located. The button 208(1) may be selected by the user's thumb. The button 208(4) may be associated with the tip 204 and may be selected by the user tapping the tip 204 of the stylus 202 to a surface (e.g., one of the display devices 108, 110 of FIG. 1). The buttons 208(2), 208(3) may be located on the side of a barrel of a cylindrical body of the stylus 202 and may be configured similar to a left-mouse button and a right-mouse button on a mouse-type input device.

Displaying a Shadow of a Stylus

Figure 4:
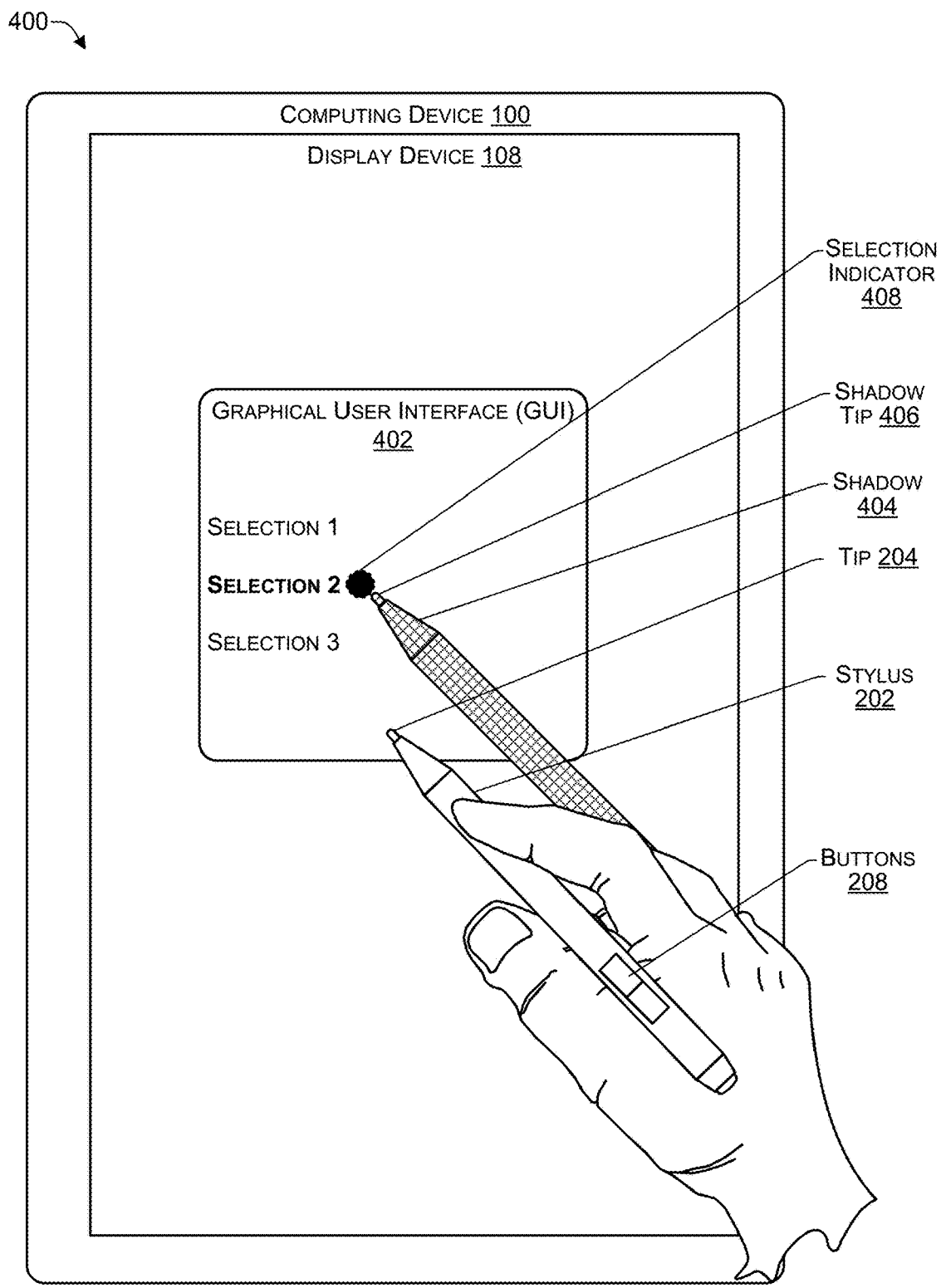
FIG. 4 is a block diagram of a display device displaying a shadow of a stylus according to some embodiments.

FIG. 4 is a block diagram 400 of a display device displaying a shadow of a stylus according to some embodiments. FIG. 4 illustrates how a shadow of a stylus enables precise selection in a graphical user interface (GUI) without a tip of the stylus touching a surface of a display device. For example, a selection GUI 402 that enables one of three selections to be selected may be displayed on a display device, such as, for example, the display device 108.

The computing device 100 may determine a location (e.g., in three dimensions) of the stylus 202, determine a location of the VLS, and display a virtual shadow 404 of the stylus 202. The computing device may determine and display a shadow tip 406 that corresponds to the tip 204 of the stylus 202. The shadow 404 (including the shadow tip 406) may be displayed on the display device 108 (i) when the tip 204 of the stylus 202 is not touching the surface of the display device 108, (ii) when the tip 204 of the stylus 202 is touching the surface of the display device 108, or both (i) and (ii).

To make a selection in the selection GUI 402, the user may adjust the location of the stylus 202 above the surface of the display device 108 (e.g., without any portion of the stylus 202 touching the surface of the display device 108) until the shadow tip 406 is near (e.g., within a predetermined distance from) one of the selections of the GUI 402, causing a selection indicator 408 to be displayed. For example, the selection indicator 408 may cause the selection to become bolded (e.g., as illustrated in FIG. 4), change color, flash, cause the computing device 100 to emit a noise (e.g., beep), or provide another visual and/or audible indicator indicating the selection. The user may select one of the buttons 208 of the stylus 202 to confirm the selection. For example, one of the buttons 208 may be mapped to a "confirm selection" action. After positioning the stylus 202 to select a desired selection in the GUI 402 and determining that the selection indicator 408 indicates the desired selection, the user may confirm the selection by selecting one of the buttons 208. By using the shadow 404 of the stylus 202 to perform the selection, the user may more precisely make a selection as compared to using the tip 204 of the stylus 202 to make a selection, particularly when the display device 108 is relatively small. In addition, the user may make the selection without having any portion of the stylus 202 touch the surface of the display device 108.

Figure 5:
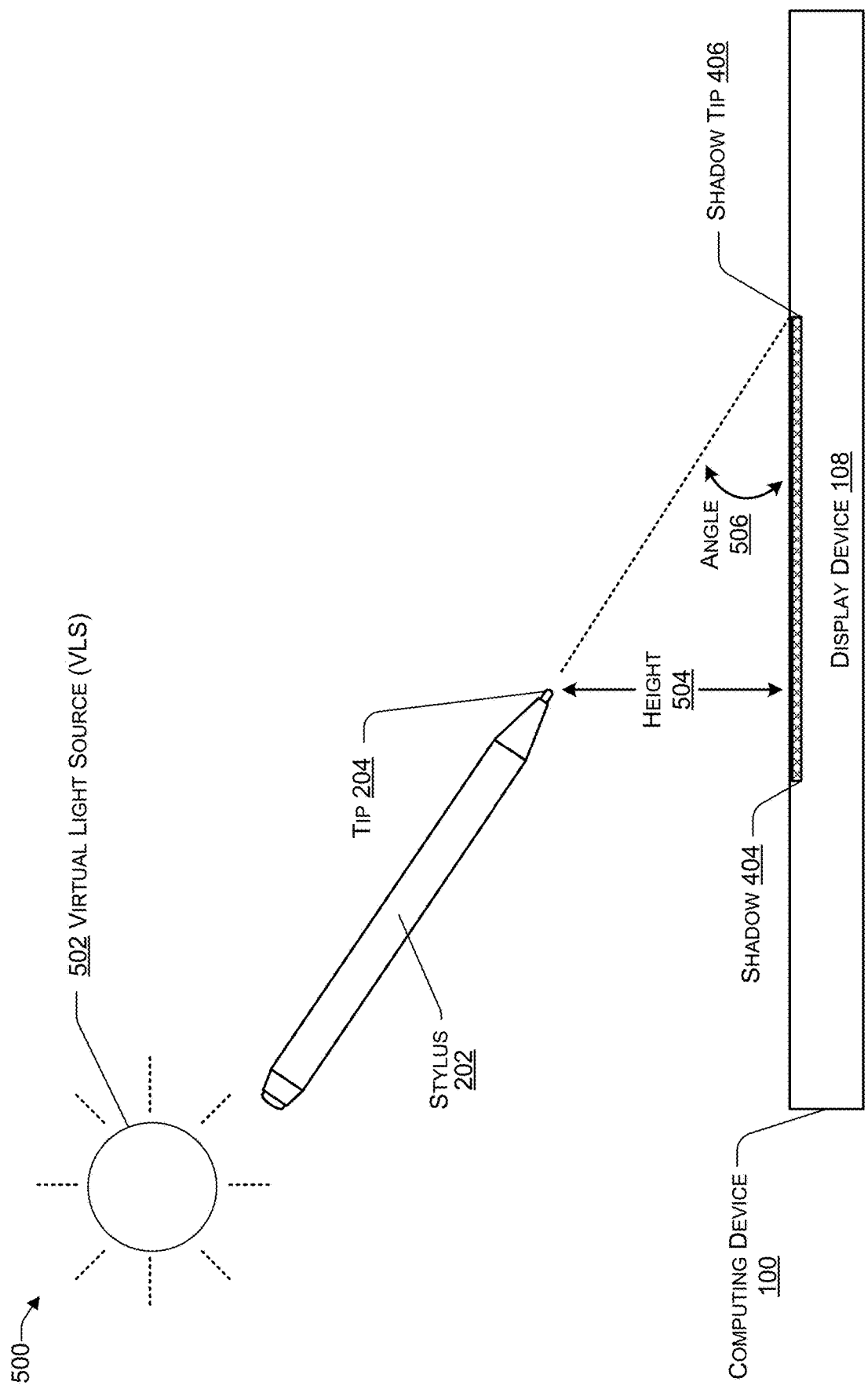
FIG. 5 is a block diagram illustrating a virtual light source creating a shadow of a stylus on a display device according to some embodiments.

FIG. 5 is a block diagram 500 illustrating a virtual light source creating a virtual shadow of a stylus on a display device according to some embodiments. The virtual shadow 404 of the stylus 202 may be created and displayed on a display device, such as, for example, the display device 108, based on a position and size of a virtual light source (VLS) 502. For example, if a real light source (e.g., light bulb) was located at a particular location, the real light source may cause a real shadow to be cast by the stylus 202. The computing device 100 may determine and display the virtual shadow 404 in about the same location and with about the same size and shape as a real shadow, as if a real light source was present where the VLS 502 is positioned. Thus, by displaying the virtual shadow 404, the user experience when using the stylus 202 to interact with the display device 108 may simulate a user with a pen (or pencil) interacting with a piece of paper while a light source casts a shadow of the pen (or pencil) on the piece of paper.

To determine (1) the location on the display device 108 where the virtual shadow 404 is to be displayed and (2) the direction of the virtual shadow 404, the computing device 100 may determine a height 504 of the tip 204 from a top surface of the display device 108 and an angle 506 of the stylus 202 relative to the display device 108. Thus, the computing device 100 may determine the height 504 of the tip 204 and the angle 506 to determine where and in which direction to display the virtual shadow 404.

FIG. 6 is a block diagram 600 illustrating a user interface to specify parameters associated with a virtual light source according to some embodiments. A VLSUI 602 may enable a user to specify various parameters associated with the VLS 502, such as, for example, a location (x, y) 604 of the VLS 502 from a center 610 of the display device 108, from a center of the 110, from a center of the computing device 100 (e.g., if the computing device 100 has more than one display device), or any combination thereof. The center may be assigned the coordinates (0, 0) and the location (x, y) 604 may be specified relative to the center at (0, 0). The VLSUI 602 may enable a user to specify a height (z) 606 of the VLS 502 from a top surface of a display device, such as the display device 108. Thus, the VLSUI 602 may enable the user to provide the three-dimensional coordinates (x, y, z) of the VLS 502. The VLSUI 602 may enable the user to specify a size of the VLS 502 by specifying a diameter 608 of the VLS 502.

The three-dimensional coordinates (x, y, z) of the VLS 502 may be relative to the center 610 of (i) a display device or (ii) the computing device 100. The x and y coordinates may each be either positive or negative depending on the location of x and y relative to (0, 0). The z coordinate will be positive since z is the height of the VLS 502 relative to a top surface of a display device.

Thus, by providing a UI to enable the user to specify a location and a size of the VLS, the user can customize how the shadow appears when the user interacts with the computing device. For example, the UI can be used to take into account in which hand the user grips the stylus (e.g., whether the user is left-handed or right-handed), the manner in which the user grips the stylus, where the user prefers to view the shadow, or other user preferences.

In the flow diagrams of FIGS. 7, 8, 9, and 11, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 700, 800, 900, and 1100 are described with reference to FIGS. 1, 2, 3, 4, 5, 6, and 10, as described herein, although other models, frameworks, systems and environments may be used to implement this process.

Figure 7:
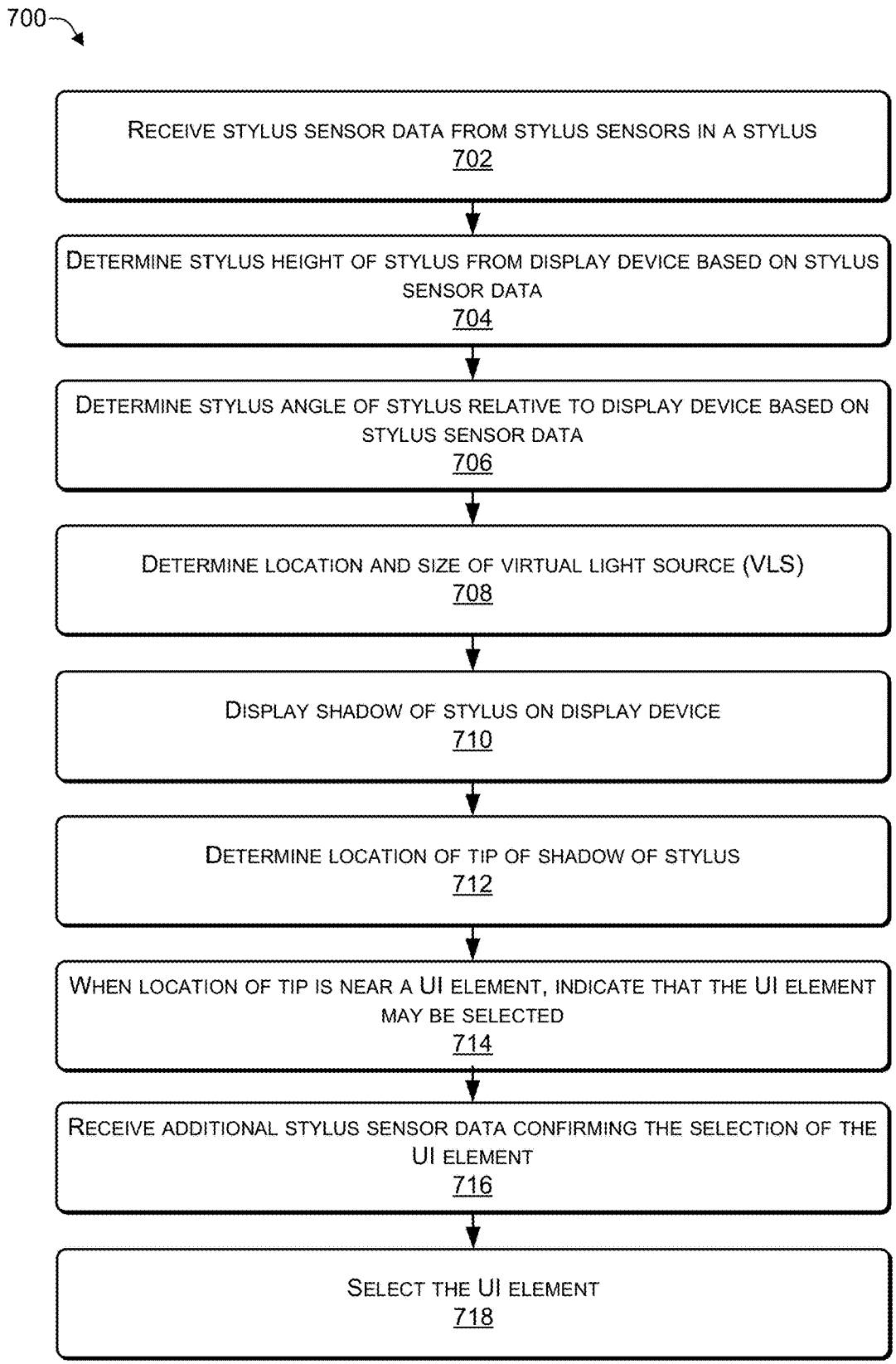
FIG. 7 is a flowchart of a process that includes displaying a shadow of a stylus on a display device according to some embodiments.

FIG. 7 is a flowchart of a process 700 that includes displaying a shadow of a stylus on a display device according to some embodiments. The process 700 may be performed by one or more software and/or hardware components of the computing device 100 of FIGS. 1, 2, 3, 4, 5, and 6.

At 702, the process may receive stylus sensor data from one or more stylus sensors located in a stylus. At 704, the process may determine a stylus height of the stylus relative to a top surface of a display device based on the stylus sensor data. At 706, the process may determine a stylus angle of the stylus relative to the display device based on the stylus sensor data. For example, in FIG. 2, the computing device 100 may receive the stylus sensor data 262 from the sensors 210 in the stylus 202. In FIG. 5, the computing device 100 may determine the height 504 of the stylus tip 204 from the top surface of the display device 108 based on the stylus sensor data 262 and determine the angle 506 based on the stylus sensor data 262.

At 708, a location and a size of a virtual light source (VLS) may be determined. At 710, a shadow of the stylus may be displayed on the display device. For example, in FIG. 5, the computing device 100 may determine a location and size of the VLS 502 and, based on the height 504 and the angle 506 of the stylus 202, generate and display the shadow 404 on the display device 108.

At 712, a location of a tip of the shadow of the stylus may be determined. At 714, when the tip of the shadow is determined to be near (e.g., within a predetermined distance from) a UI element, a visual (and/or audible) indication that the UI element may be selected may be provided. At 716, additional stylus sensor data (e.g., button press data indicating a button press of the stylus) confirming the selection may be received from the stylus. At 718, the UI element may be selected. For example, in FIG. 4, the process may determine a location of the shadow tip 406. If the process determines that the shadow tip 406 is located near a selectable UI element (e.g., selection 2 in FIG. 4), then the process may provide the selection indicator 408 (e.g., visual and/or audible). For example, the selection indicator 408 may modify the color, color intensity, font, or other visual characteristic of the selection, provide an audible indicator, or both. If the user selects one of the buttons 208 of the stylus 202, then the stylus 202 may send additional stylus sensor data confirming the selection to the computing device 100 and the computing device may confirm the selection of the UI element (e.g., selection 2 in FIG. 4).

Thus, when a user is interacting with a computing device using a stylus, the sensors in the stylus may send stylus sensor data to the computing device. The computing device may determine the height of the tip of the stylus from and the angle of the stylus relative to a display device of the computing device. The computing device may determine the user-specified size and location of a VLS. Based on the height and angle of the stylus and the size and location of the VLS, the computing device may determine the dimensions (e.g., length and width) of a shadow of the stylus, calculate where on the display device the shadow would appear (e.g., if the VLS was an actual light source), and display a virtual shadow of the stylus on the display device. The stylus may transmit the stylus sensor data every N milliseconds (N>0) or when a sensor detects a change. Thus, when the user is using the stylus to interact with the computing device, the computing device may receive a stream of stylus sensor data and repeat the process 700 multiple times a second. In this way, the movement of the stylus shadow displayed on the display device may correspond to the movements of the stylus, providing a natural and intuitive visual indicator that mimics the shadow of a pen (or pencil) that moves when used to interact with a pad of paper.

Figure 8:
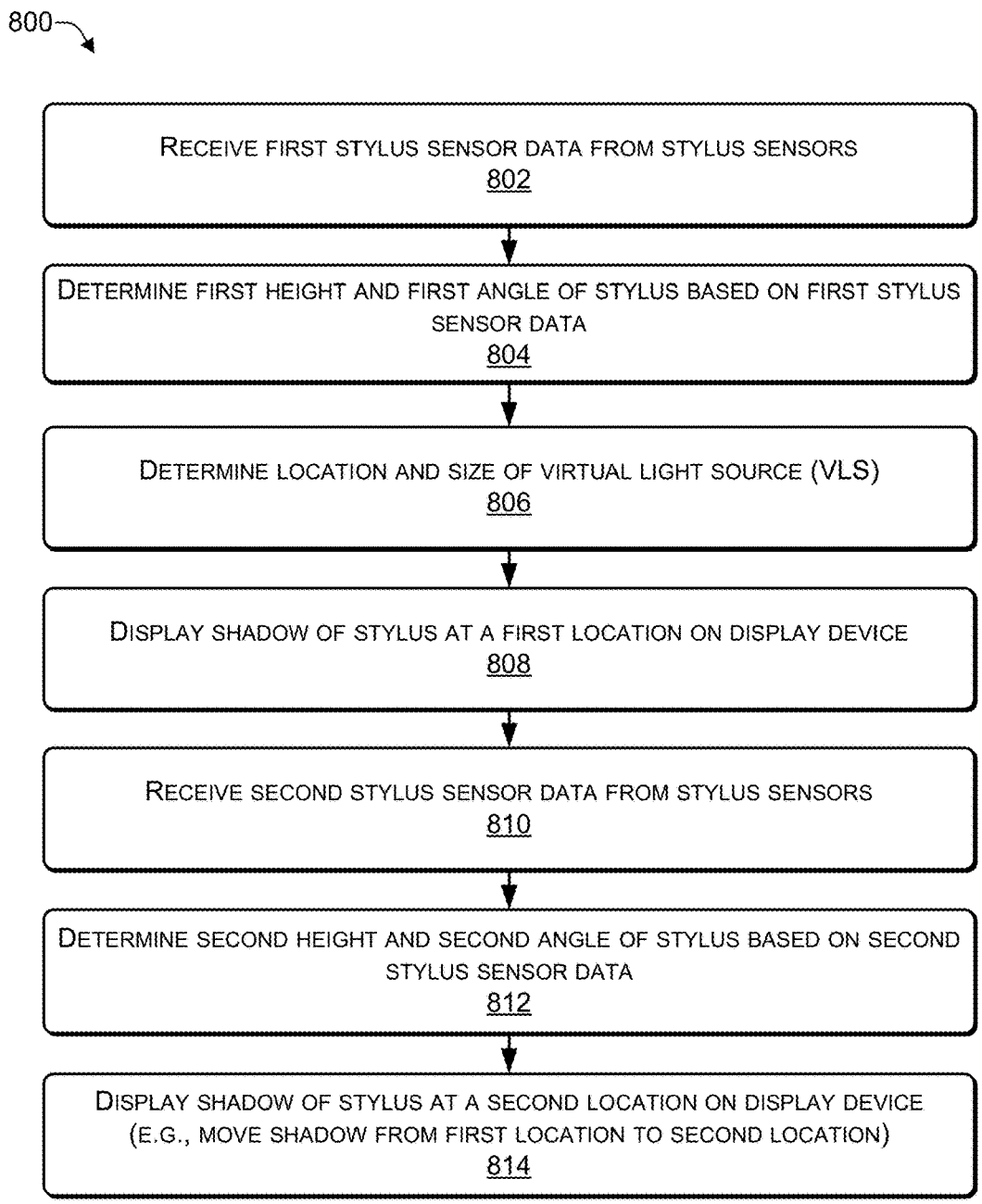
FIG. 8 is a flowchart of a process that includes displaying a shadow of a stylus at a second location on a display device according to some embodiments.

FIG. 8 is a flowchart of a process 800 that includes displaying a shadow of a stylus at a second location on a display device according to some embodiments. The process 800 may be performed by one or more software and/or hardware components of the computing device 100 of FIGS. 1, 2, 3, 4, 5, and 6.

At 802, the process may receive first stylus sensor data from one or more stylus sensors located in a stylus. At 804, the process may determine, based on the first stylus sensor data, a first stylus height of the stylus and determine a first stylus angle of the stylus relative to a top surface of a display device. For example, in FIG. 2, the computing device 100 may receive the stylus sensor data 262 from the sensors 210 in the stylus 202. In FIG. 5, the computing device 100 may determine the height 504 of the stylus tip 204 from the top surface of the display device 108 based on the stylus sensor data 262 and determine the angle 506 based on the stylus sensor data 262.

At 806, a location and a size of a virtual light source (VLS) may be determined. At 808, a shadow of the stylus may be displayed at a first location on the display device. For example, in FIG. 5, the computing device 100 may determine a location and size of the VLS 502 and, based on the height 504 and the angle 506 of the stylus 202, generate and display the shadow 404 on the display device 108.

At 810, the process may receive second stylus sensor data from the stylus sensors. At 812, the process may determine, based on the second stylus sensor data, a second stylus height of the stylus and determine a second stylus angle of the stylus relative to a top surface of a display device. For example, in FIG. 2, the computing device 100 may receive the stylus sensor data 262 from the sensors 210 in the stylus 202. In FIG. 5, the computing device 100 may determine the height 504 of the stylus tip 204 from the top surface of the display device 108 based on the stylus sensor data 262 and determine the angle 506 based on the stylus sensor data 262.

At 814, a shadow of the stylus may be displayed at a second location on the display device. For example, in FIG. 5, the computing device 100 may determine a location and size of the VLS 502 and, based on the height 504 and the angle 506 of the stylus 202, generate and display the shadow 404 on the display device 108.

Thus, the user may position the stylus at a first height and a first angle, causing the computing device to display the stylus shadow in a first location on the display device. When the user moves the stylus to a second height and/or a second angle, the computing device may move the stylus shadow from the first location to a second location on the display device. In this way, the movement of the stylus shadow may track the movement of the stylus when the user is using the stylus to interact with the touchscreen of the display device.

Figure 9:
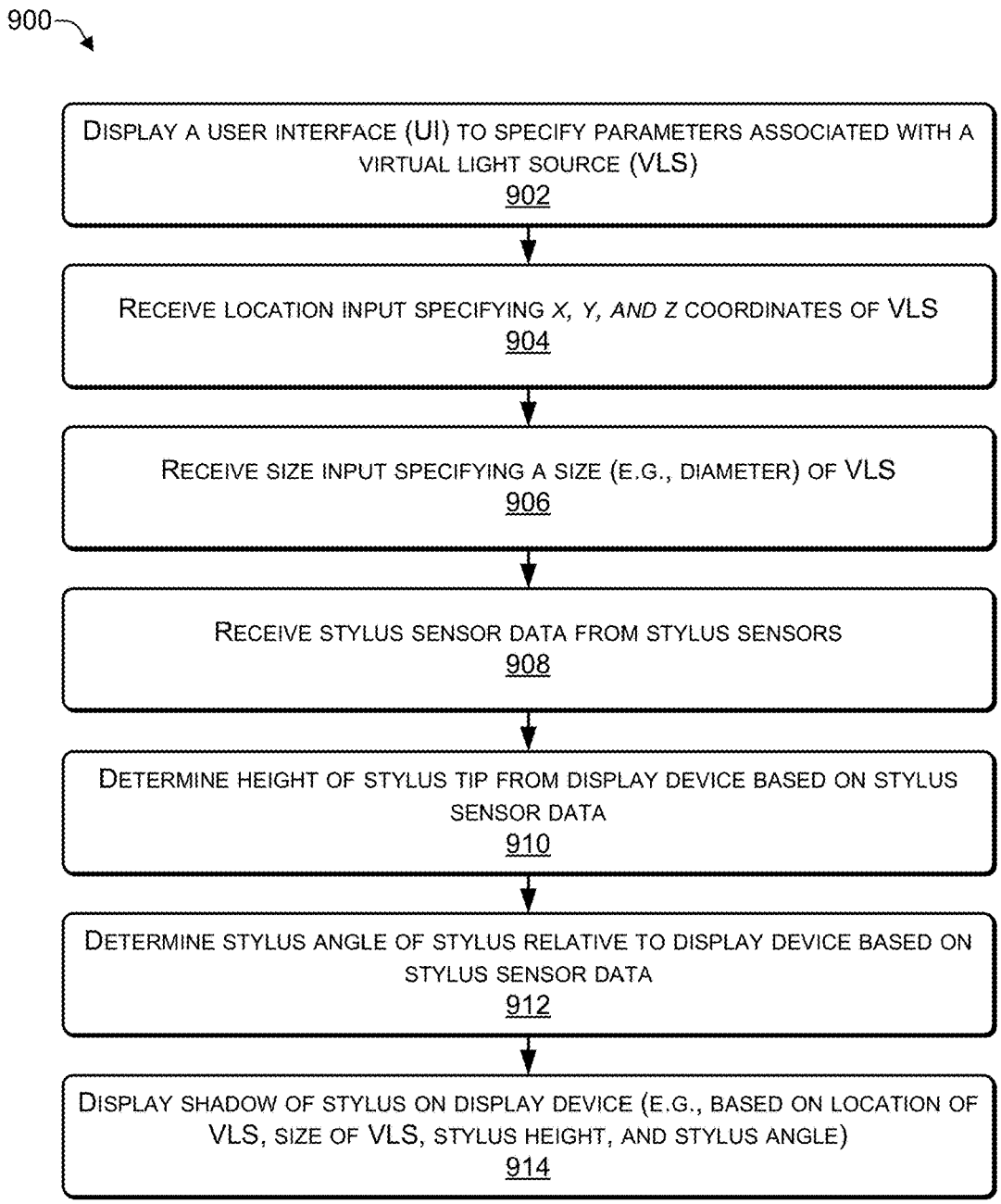
FIG. 9 is a flowchart of a process that includes displaying a user interface to specify a location of a virtual light source according to some embodiments.

FIG. 9 is a flowchart of a process 900 that includes displaying a user interface to specify a location of a virtual light source according to some embodiments. The process 900 may be performed by one or more software and/or hardware components of the computing device 100 of FIGS. 1, 2, 3, 4, 5, and 6.

At 902, a UI to specify parameters (e.g., size and location in three dimensions) associated with a VLS may be displayed. At 904, location input specifying x, y, and z coordinates in three dimensions may be received. At 906, a size (e.g., a diameter) of the VLS may be received. For example, in FIG. 6, the computing device 100 may display the VLSUI 602 to enable a user to specify the diameter 608 and the x, y, and z coordinates 604, 606 of the VLS 502. The coordinates may be specified relative to a center of a display device (e.g., as illustrated in FIG. 6) or a center of the computing device. If the computing device 100 includes two display devices, as illustrated in FIG. 1, then the center of the computing device 100 may be located between the housings 102, 104.

At 908, stylus sensor data may be received from stylus sensors located in a stylus. At 910, a height of a tip of the stylus from the display device may be determined based on the stylus sensor data. At 912, a stylus angle of the stylus relative to the display device may be determined based on the stylus sensor data. At 914, a shadow of the stylus may be displayed on the display device (e.g., based on the location and size of the VLS, the stylus height, and the stylus angle). For example, in FIG. 2, the computing device 100 may receive the stylus sensor data 262 from the sensors 210 in the stylus 202. In FIG. 5, the computing device 100 may determine the height 504 of the stylus tip 204 from the top surface of the display device 108 based on the stylus sensor data 262 and determine the angle 506 based on the stylus sensor data 262. The computing device 100 may determine a location and size of the VLS 502 and, based on the height 504 and the angle 506 of the stylus 202, display the shadow 404 on the display device 108.

Thus, a user interface may enable a user to specify a size (e.g., diameter) and a location (e.g., in three-dimensional space) of a VLS. The VLS may be used to calculate the size, shape, and direction in which to display a shadow of a stylus that is being used to interact with a touchscreen display device of a computing device. By enabling the user to specify the size and the location of the VLS, various user preferences, such as whether the user is right-handed or left-handed, how the user grips the stylus, where the user prefers to see a shadow of the stylus, and the like, may be taken into consideration. In this way, the user may interact with the computing device using a stylus in a manner similar to the way users interact with a piece of paper using a pen or pencil. The stylus may transmit the stylus sensor data every N milliseconds (N>0). As the user interacts with the computing device using the stylus, the computing device may receive a stream of stylus sensor data and repeatedly move (e.g., re-position) the shadow in accordance with the movements of the stylus. In this way, the movement of the shadow displayed on the display device may correspond to the movements of the stylus.

Displaying a Shadow of Content Items

FIG. 10 is a block diagram 1000 illustrating a user interface to specify parameters associated with a stylus as a virtual light source according to some embodiments. The top illustration in FIG. 10 shows a perspective from a side of the display device 108 while the bottom illustration in FIG. 10 shows a perspective from on top of the display device 108.

A shadow parameters UI 1002 may enable a user to specify a light diameter 1004 and virtual heights 1006. The light diameter 1004 may specify a diameter of the virtual light being emitted from the tip of the stylus 202. The virtual heights 1006 may specify a virtual height (e.g., from zero to a predetermined amount) associated with each type of content or each level of content. For example, content 1008 may have a virtual height 1018. When the stylus 202 is positioned as illustrated at the top of FIG. 10, the computing device 100 may determine that the virtual light emitted from the tip of the stylus 202 causes the content 1008 having the virtual height 1018 to cast a shadow 1010. Thus, the computing device 100 may display the shadow 1010 to aid the user in visualizing and selecting content items displayed on the display device 108.

The computing device 100 may determine (1) a size of the shadow 1010 and (2) a location on the display device 108 to display the shadow 1010 based on an illumination area 1012 created by the virtual light emitted from the tip of the stylus 202, based on an angle 1014 of the stylus 202 relative to an imaginary midpoint line ("midline") 1016 travelling lengthwise through a midpoint of the display device 108, and based on the angle 506 of FIG. 5.

A web page, a document, and other types of content may include different types of content items, such as, for example, text, photographic images, and illustrations. The text may have a first virtual height, the photographic images may have a second virtual height, and the illustrations may have a third virtual height. As another example, a user interface (first level) may include user interface elements (second level). Some of the user interface elements (second level) may include additional elements (third level), and so on. The first level element may have a first virtual height, the second level elements may have a second virtual height, and the third level elements may have a third virtual height, and so on. At least some of the virtual heights may be different from each other. For example, third virtual height>second virtual height>first virtual height.

Shadows may not be displayed for all content items being displayed. Shadows may be displayed for content items that are within the illumination area 1012, an area that is virtually being illuminated by the virtual flashlight of the stylus 202 acting as a light source. Shadows may not be displayed for content located outside the illumination area 1012.

Figure 11:
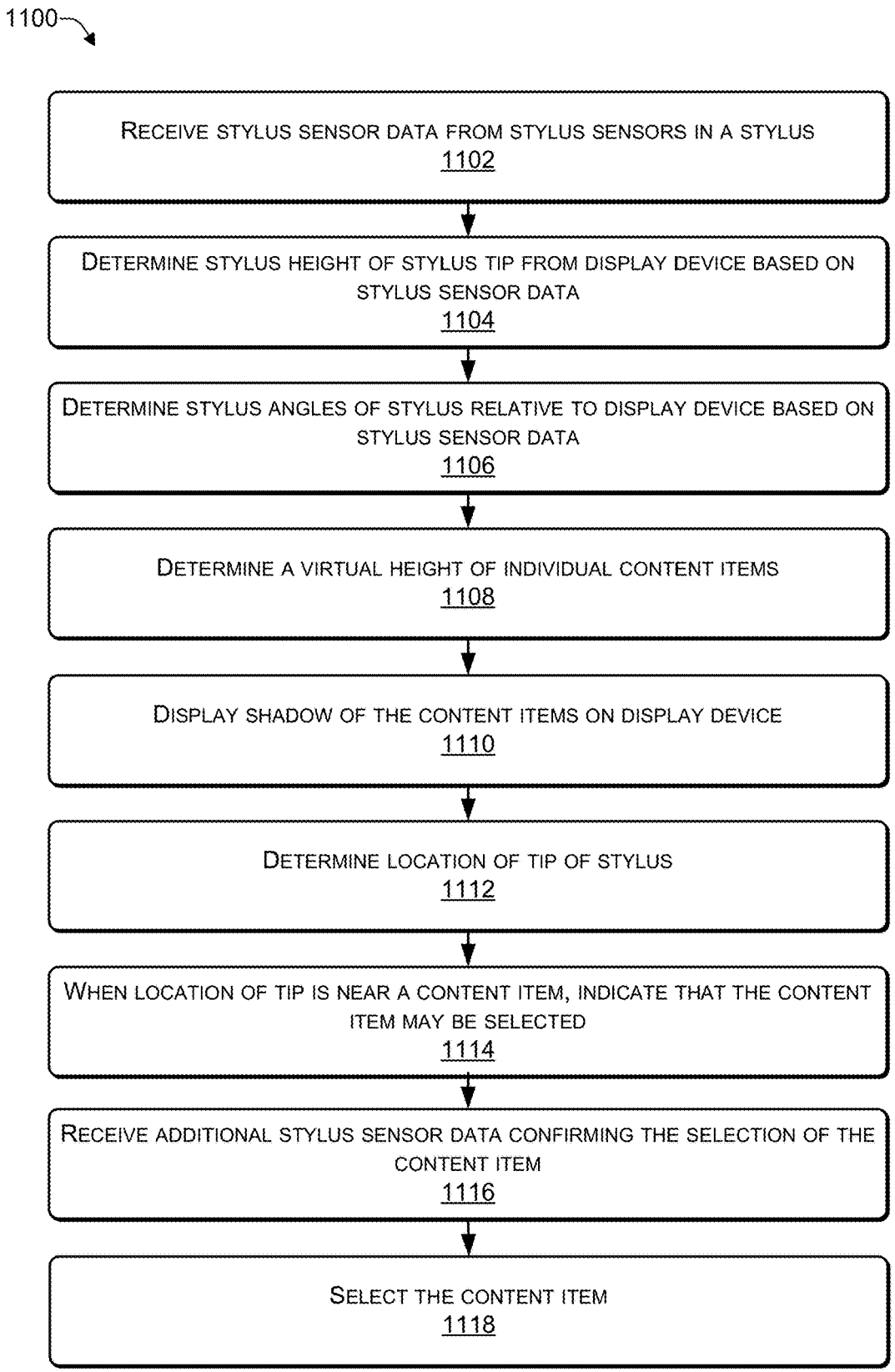
FIG. 11 is a flowchart of a process that includes displaying a shadow of content being displayed on a display device according to some embodiments.

FIG. 11 is a flowchart of a process 1100 that includes displaying a shadow of content being displayed on a display device according to some embodiments. The process 1100 may be performed by one or more components of the computing device 100. For example, the CPU 112 of FIG. 1 may execute instructions stored in the memory 116 to perform the process 1100.

At 1102, the process may receive stylus sensor data from one or more stylus sensors located in a stylus. At 1104, the process may determine a stylus height of the stylus relative to a top surface of a display device based on the stylus sensor data. At 1106, the process may determine multiple stylus angles of the stylus relative to the display device based on the stylus sensor data. For example, in FIG. 2, the computing device 100 may receive the stylus sensor data 262 from the sensors 210 in the stylus 202. In FIG. 5, the computing device 100 may determine the height 504 of the stylus tip 204 from the top surface of the display device 108 based on the stylus sensor data 262 and determine the angle 506 based on the stylus sensor data 262. In FIG. 10, the computing device 100 may determine the angle 1014 based on the stylus sensor data 262.

At 1108, a virtual height of individual content items may be determined. At 1110, a shadow of the content items may be displayed on the display device. For example, in FIGS. 5 and 10, the computing device 100 may determine the illumination area 1012 and, based on the height 504 and the angles 506, 1014 of the stylus 202, generate and display the shadow 1010 on the display device 108.

At 1112, a location of a tip of the stylus may be determined. At 1114, when the tip of the stylus is determined to be near (e.g., within a predetermined distance from) a UI element, a visual (and/or audible) indication that the UI element may be selected may be provided. At 1116, additional stylus sensor data (e.g., button press data indicating a button press of the stylus) confirming the selection may be received from the stylus. At 1118, the UI element may be selected. For example, in FIG. 10, the process may determine a location of the tip of the stylus 202. If the process determines that the tip is located near a selectable UI element, then the process may provide the selection indicator (e.g., visual and/or audible). For example, the selection indicator may modify the color, color intensity, font, or other visual characteristic of the selection, provide an audible indicator, or both. If the user selects one of the buttons 208 of the stylus 202, then the stylus 202 may send additional stylus sensor data confirming the selection to the computing device 100 and the computing device may confirm the selection of the UI element.

Thus, when a user is interacting with a computing device using a stylus, the sensors in the stylus may send stylus sensor data to the computing device. The computing device may determine the height of the tip of the stylus from and the angle of the stylus relative to a display device of the computing device and to an imaginary line running lengthwise through the midpoint (e.g., a midline) of the display device. Based on the height of content items displayed on the display device and based on angles of the stylus relative to the display device, the computing device may determine the dimensions (e.g., length and width) of a shadow of individual content items, calculate where on the display device the shadows will appear (e.g., if the stylus was a flashlight-like light source), and display one or more shadows on the display device corresponding to one or more of the content items. Note that shadows may not be displayed for all content items being displayed. Shadows may be displayed for content items that are within an illumination area, an area that is virtually being illuminated by the virtual flashlight of the stylus acting as a light source. The stylus may transmit the stylus sensor data every N milliseconds (N>0) or when a sensor detects a change. Thus, when the user is using the stylus to interact with the computing device, the computing device may receive a stream of stylus sensor data and repeat the process multiple times a second. In this way, the movement of the shadows of content items displayed on the display device may correspond to the movements of the stylus, providing a natural and intuitive visual indicator.

Figure 12:
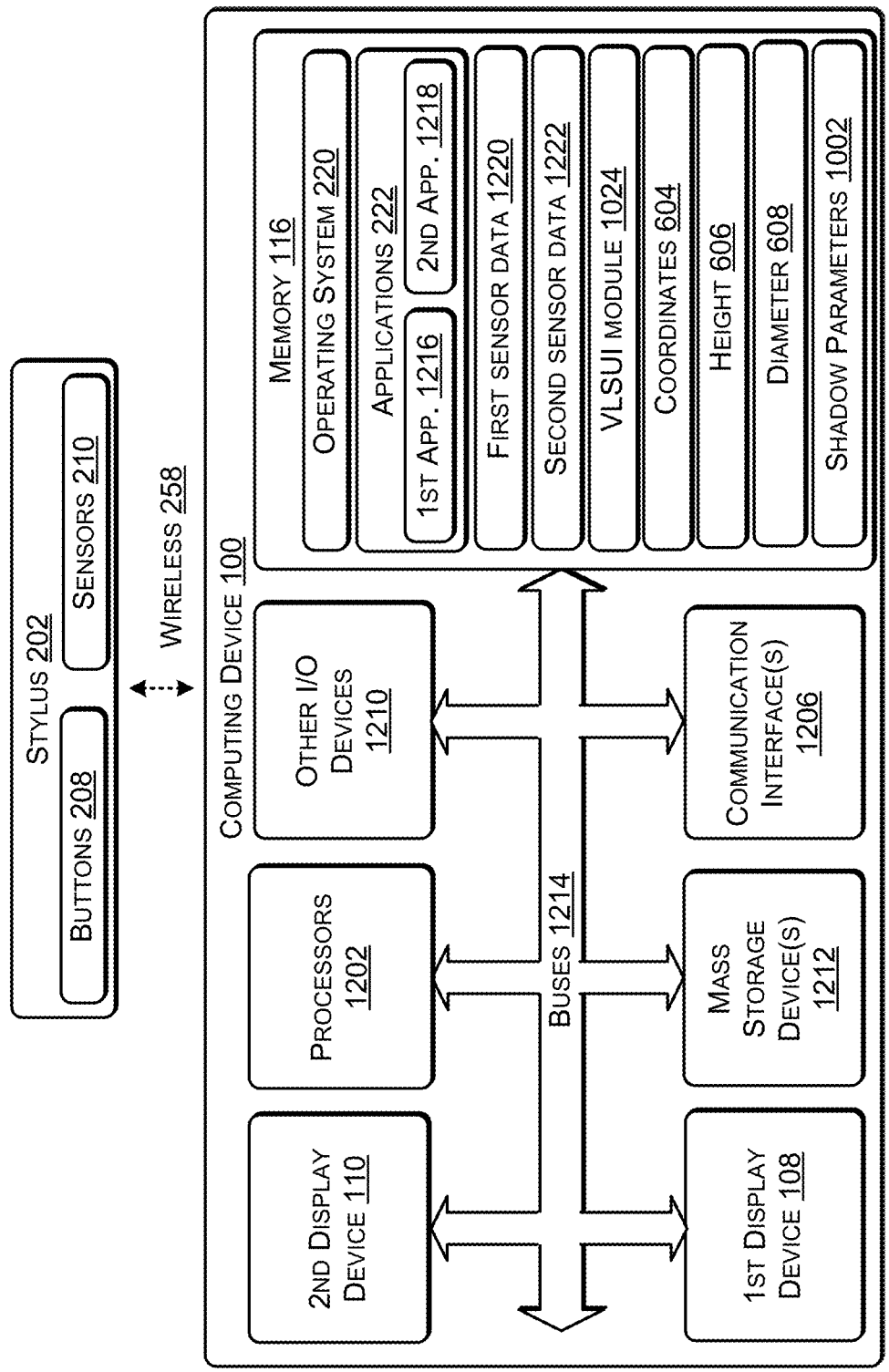
FIG. 12 illustrates an example configuration of a computing device that can be used to implement the systems and techniques described herein.

FIG. 12 illustrates an example configuration of the computing device 100 that can be used to implement the systems and techniques described herein. The computing device 100 may include one or more processors 1202 (e.g., the CPU 112 and the GPU 114 of FIG. 1), the memory 116, communication interfaces 1206 (e.g., including the I/O ports 120), the display devices 108, 110, other input/output (I/O) devices 1210 (e.g., keyboard, trackball, and the like, such as the additional components 144), and one or more mass storage devices 1212 (e.g., including the memory 116), configured to communicate with each other, such as via one or more system buses 1214 (e.g., including the data bus 128, 130) or other suitable connections. While a single system bus is illustrated for ease of understanding, it should be understood that the system buses 1214 may include multiple buses, such as a memory device bus, a storage device bus (e.g., serial ATA (SATA) and the like), data buses (e.g., universal serial bus (USB) and the like), video signal buses (e.g., Thunder-Bolt®, DVI, HDMI, and the like), power buses, etc.

The processors 1202 are one or more hardware devices that may include a single processing unit or a number of processing units, all of which may include single or multiple computing units or multiple cores. The processors 1202 may include the GPU 114 integrated into the CPU 112 or the GPU 114 may be a separate processor device from the CPU 112. The processors 1202 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 1202 may be configured to fetch and execute computer-readable instructions stored in the memory 116, mass storage devices 1212, or other computer-readable media.

Memory 116 and mass storage devices 1212 are examples of computer storage media (e.g., memory storage devices) for storing instructions that can be executed by the processors 1202 to perform the various functions described herein. For example, memory 116 may include both volatile memory and non-volatile memory (e.g., RAM, ROM, or the like) devices. Further, mass storage devices 1212 may include hard disk drives, solid-state drives, removable media, including external and removable drives, memory cards, flash memory, floppy disks, optical disks (e.g., CD, DVD), a storage array, a network attached storage, a storage area network, or the like. Both memory 116 and mass storage devices 1212 may be collectively referred to as memory or computer storage media herein, and may be any type of non-transitory media capable of storing computer-readable, processor-executable program instructions as computer program code that can be executed by the processors 1202 as a particular machine configured for carrying out the operations and functions described in the implementations herein.

The computing device 100 may also include one or more communication interfaces 1206 for exchanging data via a network. The communication interfaces 1206 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 1206 can also provide communication with external storage, such as a storage array, network attached storage, storage area network, or the like.

The display devices 108, 110 may be located in the housings 102, 104, respectively, and may be are connected using one or more hinges (e.g., the hinges 106 of FIG. 1). The hinges may enable each display device to be placed at an angle relative to the other display device. For example, the display devices 108, 110 may be used for displaying information and images to users. Other I/O devices 1210 may be devices that receive various inputs from a user and provide various outputs to the user, and may include a keyboard, a touchpad, a mouse, a printer, audio input/output devices, and so forth.

The computer storage media, such as memory 116 and mass storage devices 1212, may be used to store software and data. For example, the computer storage media may be used to store the operating system 220 of the computing device 100 and software applications 222, including, a first application 1216 and a second application 1218. The computer storage media may be used to store first sensor data 1220 (e.g., received from the sensors 210), second sensor data 1222 (e.g., received from the sensors 210), a module to display and receive input via the VLSUI, the coordinates 604, the height 606, the diameter 608, the shadow parameters 1002, as well as other data and other software.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement pre-scribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computing device comprising:
   a display device;
   one or more processors, and one or more non-transitory computer storage media to store instructions that are executable by the one or more processors to perform operations comprising:
   receiving stylus sensor data from one or more sensors in a stylus;
   determining, based on the stylus sensor data, a stylus height of a tip of the stylus from the display device;
   determining, based on the stylus sensor data, a stylus angle of the stylus relative to the display device;
   displaying, on the display device, a virtual shadow of the stylus at a first location based at least in part on:
   the stylus height of the tip of the stylus;
   the stylus angle; and
   a location of a virtual light source;
   determining a location of a shadow tip of the virtual shadow corresponding to the tip of the stylus; and
   based at least in part on determining that the location of the shadow tip of the virtual shadow is within a predetermined distance from an element in a user interface, indicating a selection of the element;
   wherein a light source interface associated with the virtual light source enables specification of:
   the location, in three dimensions, of the virtual light source relative to a center of the display device; and
   a size of the virtual light source.

2. The computing device of claim 1, wherein the operations further comprise:
   determining a change to the stylus angle of the stylus; and moving the virtual shadow based at least in part on the change to the stylus angle of the stylus.

3. The computing device of claim 1, wherein the operations further comprise:
   receiving, from the one or more sensors in the stylus, button press data indicating a confirmation of the selection of the element; and
   confirming the selection of the element in the user interface.

4. The computing device of claim 1, wherein:
   the stylus comprises one or more buttons; and
   button press data is sent from the stylus to the computing device based at least in part on detecting a button selection of a particular button of the one or more buttons.

5. The computing device of claim 1, wherein the operations further comprise:
   determining that the tip of the stylus is not touching a surface of the display device; and
   based at least in part on determining that the shadow tip of the virtual shadow is selecting a first element in the user interface:
   indicating that the first element is selected; and
   receiving, from the stylus, a confirmation that the first element is selected.

6. The computing device of claim 5, wherein the operations further comprise:
   determining that the tip of the stylus is touching the surface of the display device; and
   based at least in part on determining that the tip of the stylus is selecting a second element in the user interface confirming that the second element in the user interface is selected.

7. The computing device of claim 1, wherein the operations further comprise:
   receiving second stylus sensor data from the one or more sensors of a stylus;
   determining, based at least in part on the second stylus sensor data, a second stylus height of the tip of the stylus from the display device;
   determining, based at least in part on the second stylus sensor data, a second stylus angle of the stylus relative to the display device; and
   displaying, on the display device, the virtual shadow of the stylus at a second location based at least in part on:
   the second stylus height of the tip of the stylus;
   the second stylus angle; and
   the virtual light source.

8. A method comprising:
   receiving, by a computing device, stylus sensor data from one or more sensors in a stylus;
   determining, based on the stylus sensor data, a stylus height of a tip of the stylus from a display device that is associated with the computing device;
   determining, based on the stylus sensor data, a stylus angle of the stylus relative to the display device; and
   displaying, on the display device, a virtual shadow of the stylus at a first location based at least in part on:
   the stylus height of the tip of the stylus;
   the stylus angle; and
   a location of a virtual light source;
   determining, by the computing device, that the tip of the stylus is not touching a surface of the display device; and
   based at least in part on determining, by the computing device, that a shadow tip of the virtual shadow is selecting a first element in a user interface:
   indicating, by the computing device, that the first element is selected; and
   receiving, from the stylus, a confirmation that the first element is selected;
   wherein a light source interface associated with the virtual light source enables specification of:
   the location, in three dimensions, of the virtual light source relative to a center of the display device; and
   a size of the virtual light source.

9. The method of claim 8, further comprising:
   determining a location of the shadow tip of the virtual shadow corresponding to the tip of the stylus;
   determining that the location of the shadow tip of the virtual shadow is within a predetermined distance from the first element in the user interface; and
   indicating a selection of the first element.

10. The method of claim 9, further comprising:
    receiving, from the one or more sensors in the stylus, button press data indicating a confirmation of the selection of the first element; and
    confirming the selection of the first element in the user interface.

11. The method of claim 8, wherein:
    the stylus comprises one or more buttons; and
    based at least in part on detecting a button selection of a particular button of the one or more buttons, the stylus sends button press data from the stylus to the computing device.

12. The method of claim 8, further comprising:
    determining that the tip of the stylus is touching the surface of the display device;
    determining that the tip of the stylus is selecting a second element in the user interface; and
    confirming that the second element in the user interface is selected.

13. The method of claim 8, further comprising:
    receiving second stylus sensor data from the one or more sensors in the stylus;
    determining, based at least in part on the second stylus sensor data, a second stylus height of the tip of the stylus from the display device;
    determining, based at least in part on the second stylus sensor data, a second stylus angle of the stylus relative to the display device; and
    displaying, on the display device, the virtual shadow of the stylus at a second location based at least in part on:
    the second stylus height of the tip of the stylus;
    the second stylus angle; and
    the virtual light source.

14. One or more non-transitory computer storage media to store instructions that are executable by one or more processors to perform operations comprising:
    receiving stylus sensor data from one or more sensors in a stylus;
    determining, based on the stylus sensor data, a stylus height of a tip of the stylus from a display device that is associated with a computing device;
    determining, based on the stylus sensor data, a stylus angle of the stylus relative to the display device; and
    displaying, on the display device, a virtual shadow of the stylus at a first location based at least in part on:
    the stylus height of the tip of the stylus;
    the stylus angle; and
    a location of a virtual light source;
determining that the tip of the stylus is not touching a surface of the display device;

and based at least in part on determining that a shadow tip of the virtual shadow is selecting a first element in a user interface:
  indicating that the first element is selected; and
  receiving, from the stylus, a confirmation that the first element is selected;
  wherein a light source interface enables specification of:
    the location, in three dimensions, of the virtual light source relative to a center of the display device; and
    a size of the virtual light source.

15. The one or more non-transitory computer storage media of claim 14, wherein the operations further comprise:
  determining a location of the shadow tip of the virtual shadow corresponding to the tip of the stylus;
  determining that the location of the shadow tip of the virtual shadow is within a predetermined distance from the first element in the user interface; and
  indicating a selection of the first element.

16. The one or more non-transitory computer storage media of claim 15, wherein the operations further comprise:
  receiving, from the one or more sensors in the stylus, button press data indicating a confirmation of the selection of the first element; and
  confirming the selection of the first element in the user interface.

17. The one or more non-transitory computer storage media of claim 14, wherein:
  the stylus comprises one or more buttons; and
  button press data is sent from the stylus to the computing device based at least in part on detecting a button selection of a particular button of the one or more buttons.

18. The one or more non-transitory computer storage media of claim 15, wherein the light source interface enables specification of the location of the virtual light source per application.

19. The one or more non-transitory computer storage media of claim 18, wherein the operations further comprise:
  determining that the tip of the stylus is touching the surface of the display device; and
  based at least in part on determining that the tip of the stylus is selecting a second element in the user interface confirming that the second element in the user interface is selected.

20. The one or more non-transitory computer storage media of claim 14, wherein the operations further comprise:
  receiving second stylus sensor data from the one or more sensors of a stylus;
  determining, based at least in part on the second stylus sensor data, a second stylus height of the tip of the stylus from the display device;
  determining, based at least in part on the second stylus sensor data, a second stylus angle of the stylus relative to the display device; and
  displaying, on the display device, the virtual shadow of the stylus at a second location based at least in part on:
    the second stylus height of the tip of the stylus;
    the second stylus angle; and
    the virtual light source.

* * * * *